United States Patent
Yui (10) Patent No.: US 11,148,299 B2
(45) Date of Patent: Oct. 19, 2021

(54) TEACHING APPARATUS AND TEACHING METHOD FOR ROBOTS

(71) Applicant: DENSO WAVE INCORPORATED, Chita-gun (JP)

(72) Inventor: Daisuke Yui, Chita-gun (JP)

(73) Assignee: DENSO WAVE INCORPORATED, Aichi-Pref. (JP)

( * ) Notice: Subject to any disclaimer, the term of this patent is extended or adjusted under 35 U.S.C. 154(b) by 273 days.

(21) Appl. No.: 16/203,027

(22) Filed: Nov. 28, 2018

(65) Prior Publication Data

US 2019/0314998 A1    Oct. 17, 2019

(30) Foreign Application Priority Data

Nov. 28, 2017  (JP) .............. JP2017-227866
Nov. 26, 2018  (JP) .............. JP2018-219899

(51) Int. Cl.
  *B25J 9/16*     (2006.01)
  *B25J 13/08*    (2006.01)
  *B25J 19/02*    (2006.01)

(52) U.S. Cl.
  CPC ............ *B25J 13/089* (2013.01); *B25J 9/163* (2013.01); *B25J 9/1605* (2013.01); *B25J 19/021* (2013.01)

(58) Field of Classification Search
  CPC ........ B25J 13/089; B25J 9/1605; B25J 9/163; B25J 9/161; B25J 9/1674; B25J 19/021; G05B 2219/39451; G06T 19/006; G06T 2207/30244; G06F 3/011; G06F 3/017; G06F 3/0346

USPC .......................... 700/245, 259, 62, 65; 901/5
See application file for complete search history.

(56) References Cited

U.S. PATENT DOCUMENTS

| | | | |
|---|---|---|---|
| 2017/0210017 A1* | 7/2017 | Yamamoto | B25J 13/088 |
| 2018/0009059 A1* | 1/2018 | Aoki | B23K 26/032 |
| 2018/0345490 A1* | 12/2018 | Matsushima | B25J 13/06 |
| 2020/0030979 A1* | 1/2020 | Bank | B25J 13/08 |

FOREIGN PATENT DOCUMENTS

JP          2017-074669 A    4/2017

* cited by examiner

*Primary Examiner* — Dalena Tran
(74) *Attorney, Agent, or Firm* — Oliff PLC (57) ABSTRACT

There is provided a teaching apparatus that teaches a robot, in particular an industrial robot, a task by direct teaching. The teaching apparatus includes a wearable display that displays information in a worker's visual field, an acquisition section that acquires position and posture data capable of specifying a position and a posture of an industrial robot, and a production section that produces information to be displayed on the wearable display. When a worker operates the robot using the teaching apparatus, the apparatus produces state information that indicates at least one of a position and a posture of the robot relative to a reference object located around the robot, based on position and posture data as acquired and displays the produced information on the wearable display. There is also provided a teaching method having teaching functions equivalent to those of the apparatus.

21 Claims, 4 Drawing Sheets

TEACHING APPARATUS AND TEACHING METHOD FOR ROBOTS

CROSS-REFERENCE TO RELATED APPLICATIONS

This application is based on and claims the benefit of priorities from earlier Japanese Patent Application No. 2017-227866 filed Nov. 28, 2017 and Japanese Patent Application No. 2018-219899 filed Nov. 26, 2018, the descriptions of which are incorporated herein by reference.

BACKGROUND

Technical Field

The present disclosure relates to a teaching apparatus and a teaching method for robots, and in particular to a teaching apparatus for teaching industrial robots by direct teaching and a teaching method for such robots.

Related Art

For industrial robots operated in factories or the like (simply termed robot(s) hereinafter), behaviors to be performed by the robots are recorded in advance by teaching, so that the actual tasks are performed by reproducing the recorded behaviors. The teaching includes direct teaching, which is increasingly used recently, besides the method of recording behaviors in the form of a program as in the conventional art. In direct teaching, robot behaviors are recorded by a worker directly operating the robot (e.g., see PTL 1). Furthermore, there are also proposed techniques of virtual reality (VR), augmented reality (AR), mixed reality (MR), and the like for use in such teaching.

CITATION LIST

Patent Literatures

[PTL 1] JP 2017-74669 A

To cause a robot to behave as desired, appropriate positions or postures are required to be taught to the robot. When a robot is taught by direct teaching, approximate positions or postures can be comparatively easily taught. However, teaching correct positions or postures may be difficult because the robot is directly manipulated by a worker relying on the worker's visual sense. In such a case, fine teaching may be performed to finely determine positions. However, when fine teaching is performed, there is little benefit of using direct teaching.

SUMMARY

It is thus desired to provide a teaching apparatus and a teaching method with which one can easily keep track of the positions or postures of the robot and can appropriately and promptly teach the robot.

According to a typical embodiment, a teaching apparatus includes a wearable display that displays information in a worker's visual field, an acquisition section that acquires position and posture data capable of specifying a position and a posture of a robot, and a production section that produces information to be displayed on the wearable display. When a worker operates the robot, the apparatus produces state information that indicates at least one of a position and a posture of the robot (i.e., positional and postural states of the robot) relative to a reference object located around the robot, based on position and posture data as acquired and displays the produced information on the wearable display.

When a worker teaches a robot a task, for example, of placing a workpiece on a placement surface, the workpiece needs to be parallel to the placement surface or receive no large impacts when placed.

However, during teaching, the worker's eye position is generally assumed to be at a level higher than the placement surface. This may create a three-dimensional visual field of looking down a wrist of the robot from a level higher than the placement surface. In this case, it is difficult to find a distance between the bottom surface of the workpiece and the placement surface, or to detect tilting of the wrist if it is tilted forward or toward the depth of the visual field.

If a worker directly teaches a robot, i.e., if a worker manually operates a robot, the robot has to be moved slowly and carefully to place the workpiece so as to be parallel to the placement surface without applying a large impact. This may greatly impair the merits of direct teaching.

To cope with this, when a worker teaches a robot a task, state information is produced and displayed on the wearable display. Specifically, the teaching apparatus offers information, which is not actually present, to the worker. The state information indicates at least one of the position and the posture of the robot relative to a reference object located around the robot.

Thus, the worker can visually find a distance to the reference object or tilting of the robot relative to the reference object. Specifically, the worker can easily determine a final position of the robot without the need of precisely performing positioning as is done in fine teaching.

Accordingly, even when performing direct teaching, the worker can easily keep track of the position or the posture of the robot and thus can appropriately and promptly teach the robot. In addition, since direct teaching can be performed throughout the process of determining a final position, the merits of using direct teaching will not be impaired.

According to another example, the robot is a virtually reproduced robot. Thus, the robot can be taught, for example, regardless of whether operation is difficult for the worker, due to the robot being large or the environment of the robot being not suitable for teaching.

According to still another example, the robot is an actually present robot. Thus, an actually present robot can be taught.

According to still another example, the reference object is a virtually reproduced reference object. In the site where the robot is actually installed, it is assumed that in this example no object that can be a reference for determining the position or the posture of the robot is arranged around the robot for safety reasons. Even under such conditions, the robot can be taught by virtually reproducing a reference object.

According to another example, the reference object is an actually present reference object. Thus, the robot can be taught in an actual environment and can be prevented from colliding with the peripheral equipment.

According to still another example, the state information is produced, taking an orientation of a wrist of the robot as being a posture of the robot. While the robot typically includes a plurality of arms, it is considered that it is the wrist that is subjected to teaching in terms of position and orientation. Therefore, the robot can be appropriately taught by taking the orientation of the wrist of the robot as being the posture of the robot.

According to still another example, the teaching apparatus includes a notification section that provides a notification when a position of the robot relative to the reference object is at a distance smaller than a predetermined reference distance, and when tilting of a posture of the robot relative to the object is at an angle larger than a predetermined reference angle. Thus, for example, the robot is prevented from colliding with actually present peripheral equipment, or prevented from being taught to cross over the robot's movement range which is set for safety reasons.

According to still another example, the state information is displayed in a mode perpendicular or parallel to the reference object irrespective of the posture of the robot, the state information being displayed on a surface of the reference object located in a direction in which the robot moves, or in a space between the robot and the reference object located in a direction in which the robot moves, or at a position adjacent to another piece of state information displayed on a surface of the reference object, so as not to overlap with a wrist of the robot, a tool mounted to the wrist, or a workpiece handled by the tool. Thus, the tool is prevented from disappearing from view due to the state information being displayed. Specifically, the state information will not be an obstacle when displayed, but helps the worker easily find a relation to the posture of the robot.

According to a typical example of a teaching method for a robot, the method includes, when a worker operates the robot, displaying state information that indicates at least one of a position and a posture of the robot relative to a reference object that is located around the robot, on a wearable display worn by the worker so as to overlap with a visual field of the worker. Thus, the worker can visually keep track of the distance between the reference object and the robot or tilting of the robot relative to the reference object without impairing the merits of using direct teaching. Accordingly, similarly to the teaching device set forth above, even when using direct teaching, the position or the posture of the robot can be easily found and teaching can be performed appropriately and promptly.

DETAILED DESCRIPTION OF THE PREFERRED EMBODIMENTS

With reference to the accompanying drawings, some embodiments will be described.

Figure 1:
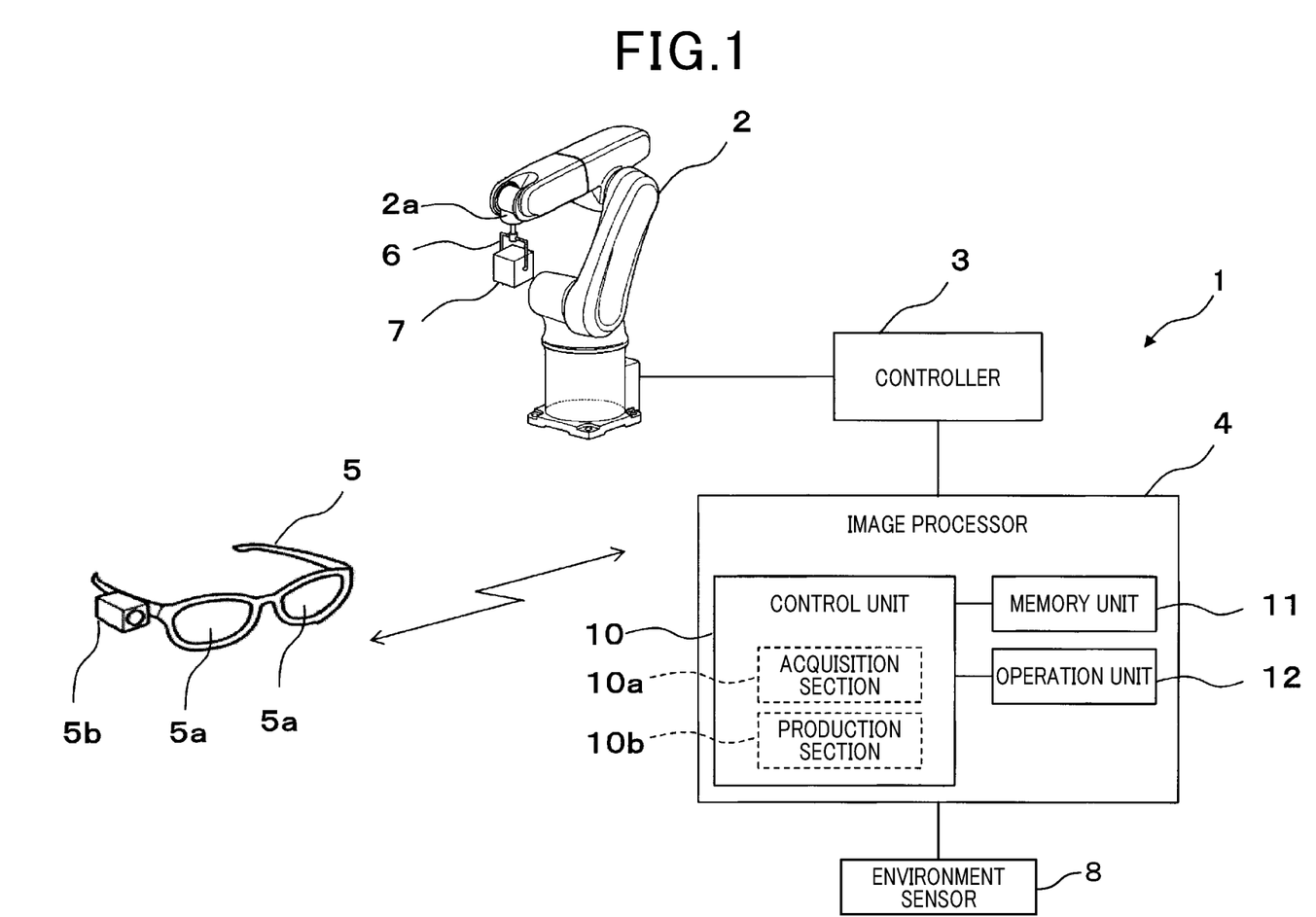
FIG. 1 is a schematic diagram illustrating a configuration of a teaching apparatus according to an embodiment.

FIG. 1 shows a teaching system 1 that provides prior direct teaching in terms of a behavior mode of a robot (e.g., industrial robot) 2. The teaching system 1 includes a controller (robot controller) 3, an image processor 4 configuring part of a teaching apparatus, and a wearable display 5 configuring part of the teaching apparatus. Of these components, the robot 2 and the controller 3, which will be described later, can be ones existing in the actual space, or may be ones reproduced in a virtual reality space. The robot 2 and the controller 3 each have a configuration suitable for direct teaching in which the robot behaviors are recorded by a worker directly or distantly manipulating the robot 2.

As an example, the robot 2 is a vertical articulated industrial robot having a plurality of arms and is referred to as a six-axis robot or a seven-axis robot. The robot 2 has a wrist 2a which is configured by a flange. The wrist 2a is used for performing a task, for example, of holding a workpiece 7 using a tool 6 mounted to the wrist, or other tasks.

As is well known, the controller drives motors incorporated into the respective joints of the robot 2 to control the behavior of the robot 2. In this case, the controller 3 holds control data with which the position of the wrist 2a or the orientation of the wrist axis (shown by reference J in FIG. 2) can be specified.

The image processor 4 includes a control unit 10, a memory unit 11 and an operation unit 12. The image processor 4 is configured to transmit or receive various data to/from the controller 3 and the wearable display 5 via control of the control unit 10 and image processing operation. The control unit 10 of the image processor 4 is provided with a microcomputer that includes a CPU, a ROM and a RAM, which are not shown, and operates according to computer programs stored in the memory unit 11 (non-transient computer readable recording medium).

The control unit 10 (specifically CPU) of the present embodiment includes an acquisition section 10a and a production section 10b which are functionally realized by executing the above programs. Specifically, these acquisition section 10a and production section 10b of the present embodiment are realized by software, according to the computer programs executed by the control unit 10.

Specifically, the acquisition section 10a acquires position and posture data that can specify the position and the posture of the robot 2. In this case, the acquisition section 10a acquires data that can specify the position of the robot 2 relative to a reference object. For example, the acquisition section 10a acquires the position of a worker detected by an environment sensor 8, or position information which is outputted from a position sensor 5c provided to the wearable display 5 described later. The acquisition section 10a also acquires data that can specify the position of the robot 2 from the controller 3. These data are combined to acquire position and posture data that can specify the position and the posture of the robot 2. The production section 10b produces information to be displayed on the wearable display 5 which will be specifically described later.

The memory unit 11 stores the computer programs and the like to be executed by the control unit 10. The operation unit 12 is configured by switches, a touch panel, and the like to receive operation of the image processor 4 from a worker. The configuration of the image processor 4 shown in FIG. 1 is only an example. A teaching pendant or the like, for example, may be used instead.

The wearable display 5 is mounted to the head of a worker to offer virtual information, and is also called head-mounted display or the like. The wearable display 5 includes display surfaces 5a, a camera 5b and a position sensor 5c. Characters, diagrams, symbols or the like are projected to the display surfaces 5a from a projector, not shown. The display surfaces 5a also serve as a notification section that gives information to the worker.

The camera 5b is configured, for example, by a CCD camera to capture an image of an object in the worker's visual field. In this case, the wearable display 5 may be configured to include a depth camera which is capable of detecting a distance to an object in the visual field. Although FIG. 1 shows only one camera 5b, the wearable display 5 may be configured to include both a CCD camera and a depth camera, or to include two or more CCD cameras.

The position sensor 5c is configured, for example, by a GPS sensor that can directly specify the position of the worker, a gyro sensor that can specify the orientation of the worker's face, i.e., the orientation of the worker's visual field, or other sensors. The position sensor 5c is provided inside the housing of the camera 5b to acquire the position of the worker or the orientation of the visual field as position information, for transmission to the image processor 4. However, it may be so configured that the position sensor 5c is provided separately from the camera 5b.

The teaching system 1 also includes an environment sensor 8. The environment sensor 8 may be configured, for example, by a CCD camera or a laser radar to detect the position or shape of an object around the robot 2, or the position or the orientation of the worker's face. However, all of these do not necessarily have to be detected by the environment sensor 8. The environment sensor 8 can dispense with such detection if the wearable display 5 is configured to detect the position of the worker, the orientation of the worker's face, or the like by a camera 5b or a position sensor 5c. Alternatively, if the environment sensor 8 is configured to detect the position of the worker, the orientation of the worker's face, or the like, the wearable display 5 does not have to detect them.

The following description explains the operations of the components mentioned above.

Figure 2:
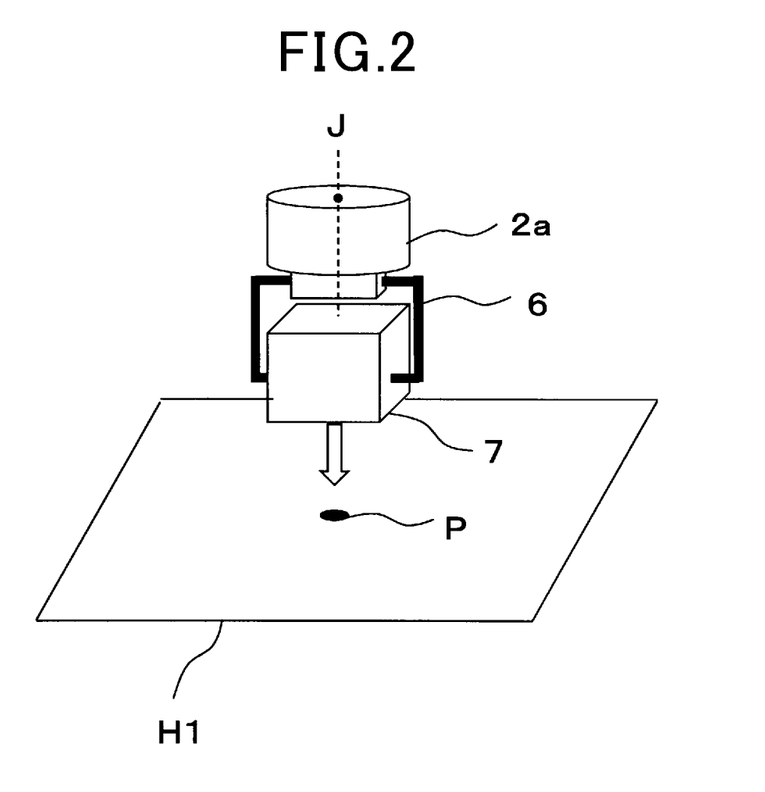
FIG. 2 is a schematic diagram illustrating an example of a worker's visual field during teaching.

FIG. 2 shows a generally used teaching mode, or schematically shows the worker's visual field when teaching the robot a task of placing a workpiece 7, which is held by the tool 6 mounted to the wrist 2a, onto a target position (P) of a placement surface (H1) by direct teaching. It should be noted that the present embodiment is based on an assumption that the worker manually performs teaching throughout the process of determining a final position, and that the target position (P) shown in FIG. 2 is a position where the worker desires to place the workpiece 7, not a predetermined position.

When placing the workpiece 7 on the placement surface (H1), the workpiece 7 needs to be held parallel to the placement surface (H1) or to be prevented from application of a large impact thereto when placed to prevent damage to the workpiece 7.

During teaching, the worker's eye position is generally assumed to be at a level higher than the placement surface (H1). This may create, as shown in FIG. 2, a three-dimensional visual field of looking down the placement surface (H1) from above. In this case, it is difficult to find a distance between the bottom surface of the workpiece 7 and the placement surface (H1), or to find tilting in the lateral direction or in a forward direction or in a direction toward the depth as viewed in FIG. 2.

As a result, the robot 2 has to be moved slowly and carefully to manually place the workpiece 7 so as to be parallel to the placement surface (H1) without applying a large impact thereto. This may greatly impair the merits of direct teaching.

Accordingly, it is so configured herein that the position or the posture of the robot 2 is easily found and that teaching is appropriately and promptly performed even when the teaching is direct teaching or, in particular, even when teaching is manually performed throughout the process of determining a final position.

Figure 3:
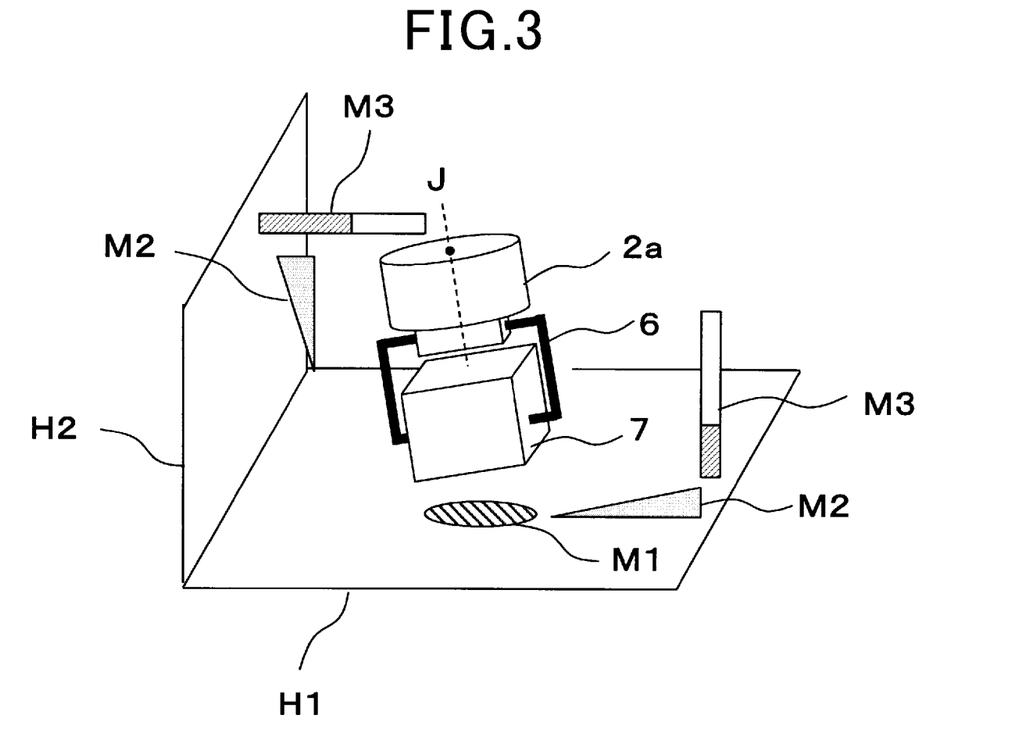
FIG. 3 is a schematic diagram illustrating an example of a mode of indicating state information in a worker's visual field.

Specifically, when the robot 2 is operated by a worker, the image processor 4 acquires position and posture data (i.e., showing positional and postural states of the robot 2) from the controller 3 to produce state information (M1 to M3) to be displayed on the wearable display 5. The state information indicates, as shown in FIG. 3, at least one of the position and the posture of the robot 2 relative to a vertical surface (H2) as a reference object which is located or virtually established around the robot 2. The reference object may be produced as a virtual object by the image processor 4 and reproduced in the virtual space, or may be an object that is present in an actual space and contained in an image captured by the camera 5b.

In this case, the reference object may, for example, be a vertical surface, a horizontal surface, or the like, so that the worker can intuitively understand a positional relationship between the reference object and the wrist 2a of the robot 2. Alternatively, peripheral equipment, a wall or a pole actually present around the robot 2 may be determined as a reference object. Alternatively, a control boundary position, such as a movement range of the robot 2, may be determined as a reference object.

Figure 4:
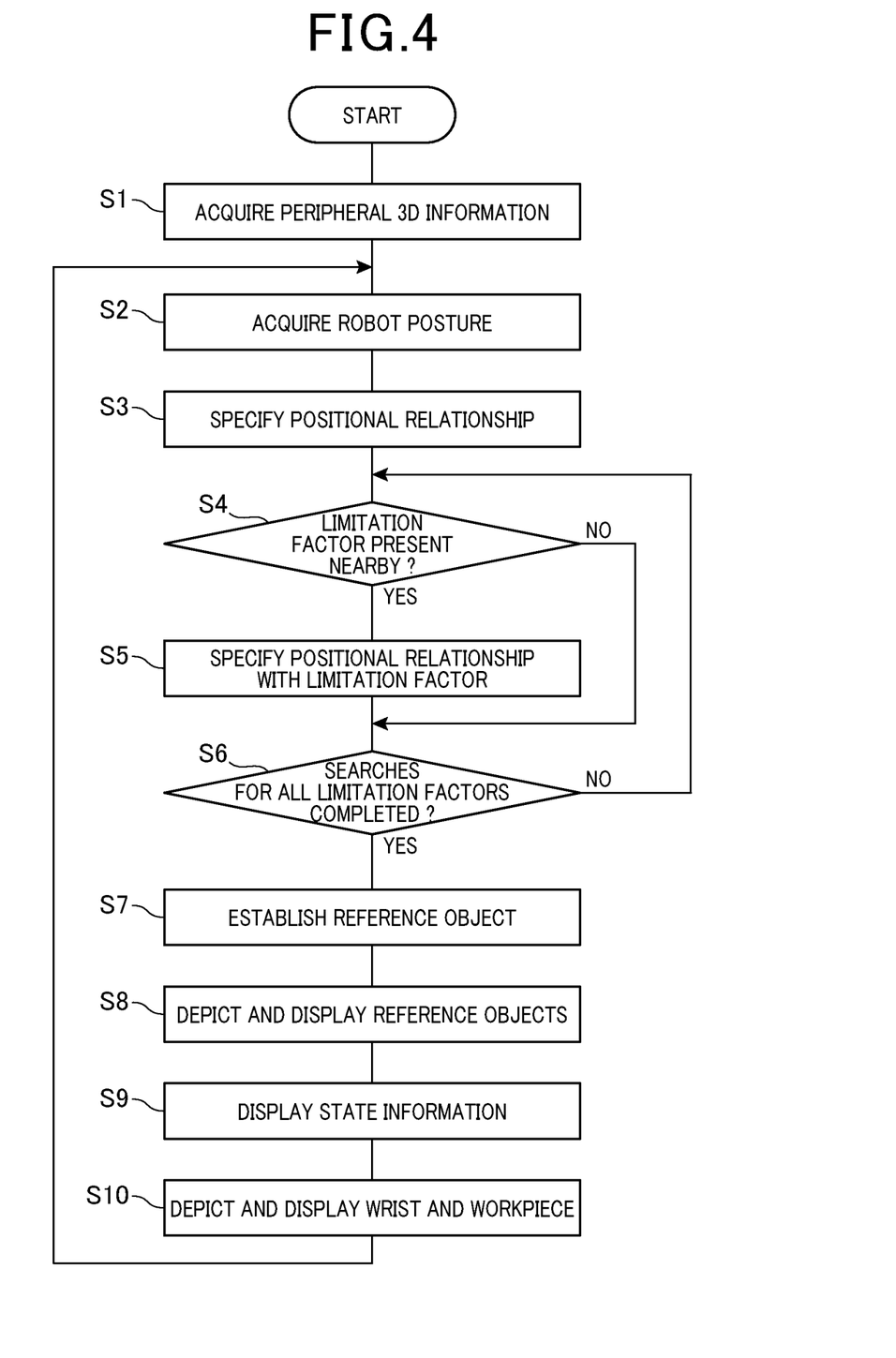
FIG. 4 is a flow diagram illustrating a process of displaying state information, which is performed by a control unit collaborating with a robot controller and a wearable display.

The following description explains a process flow of displaying the state information mentioned above. This process is performed by the control unit 10 of the image processor 4 in collaboration with the controller (robot controller) 3 and the wearable display 5.

As shown in FIG. 4, the control unit 10 (CPU) firstly acquires peripheral 3D information through a process of a computer program read from the memory unit 11 (S1). The peripheral 3D information includes data regarding positions, shapes or the like of objects, such as peripheral equipment and walls, that are present around the robot 2. It should be noted that the peripheral 3D information can be prepared in advance by acquiring and registering the peripheral equipment, walls or the like that are present around the robot 2 as CAD data. The peripheral 3D information can be acquired by analyzing an image captured by the camera 5b of the wearable display 5 when starting teaching, or by using the positions or the shapes of objects around the robot 2 detected by the environment sensor 8.

Subsequently, the control unit 10 acquires a posture of the robot 2 (S2). The posture of the robot 2 can be acquired from or specified by the control data which is retained by the controller 3 controlling the robot 2. Then, the control unit 10 specifies a position of the robot 2 as viewed from the worker, i.e., a relationship between the worker and the robot 2 (S2). In this case, the positional relationship between the worker and the robot 2 can be specified based on a relationship between the position of the worker and the installation position of the robot 2. Alternatively, the positional relationship between the worker and the robot 2 can be specified by specifying an orientation of the robot 2 as viewed from the worker, by storing 3D configuration data of the robot 2 in advance and processing an image captured by the camera 5b by pattern matching or the like.

In this case, the positional relationship between the worker and the robot 2 can be specified as long as the visual field includes part or all of the portion from which characteristics of the wrist 2a, the workpiece 7 or the like can be easily found, instead of including the entire robot 2. Alternatively, the position of the worker may be specified by setting a standing position as a reference position in a workplace, initializing position information when the worker is positioned at the standing position, and obtaining a travel distance from the standing position using a gyro sensor.

Alternatively, the positional relationship between the worker and the robot 2 may be specified by placing a mark, whose orientation or size is known, on the robot 2 in advance, and obtaining the orientation or size of the mark through image processing. Alternatively, if the wearable display 5 is provided with a GPS sensor or if the worker's position can be specified by the environment sensor 8, the positional relationship between the worker and the robot 2 may be specified based on the position of the worker. Since the laser radar of the environment sensor 8 is basically considered to be positionally fixed, light emitted from the laser radar may be detected by the camera 5a, and a position relative to the laser radar may be specified to thereby specify a positional relationship relative to the worker's position or the robot 2.

Then, the control unit 10 determines whether there is any limitation factor in the vicinity of the robot 2, i.e. in the vicinity of the wrist 2a of the robot 2 or the workpiece 7 held by the wrist 2a (S4). The limitation factor refers to a factor limiting the movement of the robot 2, e.g., a physically present object such as peripheral equipment or a pole, or a boundary of the movement range of the robot 2. At step S4, the control unit 10 determines, for example, whether there is any limitation factor within a predetermined distance range from the wrist 2a or the workpiece 7. If there is any limitation factor which becomes positional and/or spatial constraint (YES at S4), the control unit 10 specifies a positional relationship with the limitation factor (S5). Specifically, the control unit 10 specifies a distance between the wrist 2a of the robot 2 or the workpiece 7 and the limitation factor, and an angle of the former relative to the limitation factor. Thus, a positional relationship with the limitation factor specified in this way is displayed as state information.

After specifying the positional relationship, the control unit 10 determines whether searches for all the limitation factors nearby have been completed (S6). If not yet completed (NO at S6), control returns to step S5 to specify a positional relationship with the subsequent limitation factor. In the process flow, all the limitation factors present within the predetermined distance range may be determined first, and then a positional relationship with each of the limitation factors may be specified.

After specifying limitation factors, the control unit 10 establishes a reference object (S7). In this case, the reference object to be established may, for example, be a limitation factor that is present within a predetermined distance range from the current position of the wrist 2a. For example, in the example shown in FIG. 3, the placement surface (H1) and the vertical surface (H2) are determined to be limitation factors and are established as reference objects. However, for example, one limitation factor nearest from the current position of the wrist 2a may be selected as a reference object. Alternatively, if one reference object is selected, a plane perpendicular to this reference object may be virtually established for use as a virtual reference object comparable with an actually present reference object. Thus, the worker can more easily and intuitively find a positional relationship.

Then, the control unit 10 depicts and displays the reference objects (S8). In the case of the example shown in FIG. 3, for example, the control unit 10 may depict the perimeter of the physical placement surface (H1) with a colored line, and the vertical surface (H2) with a different colored line, so that the reference objects are displayed on the display surfaces 5a in a mode in which the worker can visually find them. However, physically present limitation factors do not have to be necessarily depicted and displayed, and only virtually established limitation factors may be depicted and displayed.

Then, the control unit displays the state information (S9) and depicts and displays the wrist 2a or the workpiece 7 with, for example, a colored line (S10). In this case, if an actually present robot 2 is taught, the wrist 2a or the workpiece 7 does not have to be necessarily depicted and displayed. If a virtually reproduced robot 2 is taught in a virtual space, the reference object or the wrist 2a or the workpiece 7 is depicted and displayed.

After that, the control unit 10 allows control to return to step S2 and iterates the process of displaying state information based on movement of the worker or change of the visual field. Thus, the state information as shown in FIG. 3 is displayed in the visual field of the worker. In this case, while peripheral 3D information is considered not to change basically, control may return to step S1, so that peripheral 3D information can be acquired again every time the worker has moved or the visual field has changed.

Specifically, the state information (M1) corresponds to a virtual image offering a position where the workpiece 7 is to be placed on the placement surface (H1), and thus becomes larger as the workpiece 7 approaches the placement surface (H1). The state information (M1) is displayed in a mode in which the workpiece 7 appears frontward to the worker on the placement surface (H1). Specifically, the state information (M1) is displayed in a mode of casting a shadow of the workpiece 7 on the placement surface (H1) during movement of the robot 2 if light is applied to the wrist 2a, i.e., the workpiece 7 herein, from behind, or from a direction opposite to the direction in which the robot 2 moves toward the placement surface (H1).

Therefore, the apparent width of the workpiece 7 matches the apparent width of the state information (M1). In addition, at the time point when the state information (M1) has disappeared, the workpiece 7 can be determined as having contacted the placement surface (H1). If the robot is moving toward the vertical surface (H2), the state information may be displayed in a mode of casting a shadow on the vertical surface (H2). By displaying the state information (M1) like a shadow that is cast on a reference object located at a movement destination of the wrist 2a or the workpiece 7, movement direction of the wrist 2a or the workpiece 7 and the state of approach thereof to the reference object can be visually offered.

The state information (M2) visually provides tilting of the wrist axis (J) relative to the placement surface (H1) and the vertical surface (H2), i.e. objects positioned near the robot 2. Of the two pieces of state information (M2) shown in FIG. 3, the state information (M2) on the right as viewed in the figure indicates a tilting of the wrist axis (J) relative to the placement surface (H1). Specifically, the tilting is displayed in the form of a right triangle with the long side thereof being parallel to the placement surface (H1), the short side thereof being on the right side, and the hypotenuse thereof being sloped downward to the left, so that the worker can intuitively find that the wrist axis (J) is tilted leftward, as viewed in the figure, relative to the vertical direction. More specifically, the state information (M2) is displayed in a mode appearing parallel to the placement surface (H1) which is also a reference object.

The state information (M2) on the left of FIG. 3 indicates tilting of the wrist axis (J) relative to the vertical surface (H2). The tilting is displayed in the form of a right triangle with the long side thereof being parallel to the vertical surface (H2), the short side thereof being on top, and the hypotenuse thereof being sloped downward to the right, so that the worker can intuitively find that the wrist axis (J) is tilted leftward, as viewed in the figure, relative to the vertical surface (H1). Specifically, this state information (M2) is displayed in a mode appearing parallel to the vertical surface (H2). The state information (M2) can be displayed using a numerical value instead of a graphic pattern, or can be displayed using both a graphic pattern and a numerical value.

The state information (M2) may be displayed using color coding if, for example, the posture relative to a reference object is tilted by not less than a predetermined reference angle. Thus, the statement information (M2) can also be used as information for notifying the worker that the robot 2 is greatly tilted relative to the reference object, i.e., relative to an assumed orientation.

The state information (M3) indicates a distance between the robot 2 and a reference object, or more precisely, a distance between a portion nearest to a reference object in the robot 2, including the workpiece 7, and the reference object. In FIG. 3, similarly to the state information (M2), the state information (M3) is displayed for the placement surface (H1) and the vertical surface (H2). The state information (M3) is in a rectangular shape having a predetermined length and width. A fill pattern is provided to each rectangle according to the distance to the reference object to indicate the distance between the workpiece 7 and the reference object. Specifically, the state information (M3) is displayed in a mode appearing perpendicular to the placement surface (H1) or the vertical surface (H2).

The state information (M3) is displayed in the present embodiment if the distance between the robot 2 and a reference object is smaller than a predetermined reference distance. Specifically, the state information (M3) may be used as information for notifying the worker that the robot 2 has approached close to the reference object. The state information (M3) may be displayed using a numerical value instead of a graphic pattern, or may be displayed using both a graphic pattern and a numerical value.

Specifically, the state information (M1 to M3) is displayed in a mode perpendicular or parallel to a reference object (H1, H2) irrespective of the posture of the robot 2. In this case, the state information (M1 to M3) is displayed on a surface of the reference object (H1) located in a direction in which the robot 2 moves, or in a space defined by reference objects (H1, H2) located in a direction in which the robot 2 moves, or at a position adjacent to another piece of state information (M1) displayed on a surface of the reference object (H1) (refer to state information (M2)), so as not to overlap with the wrist 2a of the robot 2, the tool 6 mounted to the wrist 2a, or the workpiece 7 handled, held herein, by the tool 6.

In this way, the teaching apparatus produces and displays state information in a virtual space or in an actual space so that the worker can easily keep track of the position and the posture of the robot 2 visually and intuitively relative to a reference object.

The teaching apparatus described above can achieve advantageous effects as follows.

The teaching apparatus includes the wearable display 5 that displays information in the worker's visual field, the acquisition section 10a that acquires position and posture data for specifying the position and the posture of the robot 2 relative to a reference object, and a production section 10b that produces information to be displayed on the wearable display 5. When a worker operates the robot 2, the teaching apparatus produces and displays state information (M1 to M3) that indicates at least one of the position and the posture of the robot 2 relative to a reference object (H1, H2) located around the robot 2, based on the acquired position and posture data. The reference object may be one that is virtually established near the robot 2.

For example, when teaching the robot 2 a task of placing a workpiece 7 on the placement surface (H1), the workpiece 7 is required to be parallel to the placement surface (H1) and required not to receive a large impact when placed thereon. However, in a three-dimensional visual field of looking down the robot from a level higher than the placement surface (H1), it is difficult to find a distance between the workpiece 7 and the placement surface (H1) or to find tilting of the wrist 2a.

To cope with this, when a worker teaches the robot 2 a task, state information (M1 to M3) is produced and displayed on the wearable display 5, i.e., information that is not present in an actual space is offered to the worker. The state information indicates at least one of the position and the posture of the robot 2 relative to the reference object (H1, H2) located around the robot 2.

Thus, the worker can visually find a distance to the reference object (H1, H2) or tilting of the robot 2 relative to the reference object (H1, H2). Specifically, the worker can easily determine a final position of the robot 2 without the need of precisely performing positioning as in fine teaching.

Accordingly, even when performing direct teaching, the worker can easily keep track of the position or the posture of the robot 2 and thus can appropriately and promptly teach the robot. In addition, since direct teaching can be performed throughout the process of determining a final position, the merits of using direct teaching will not be impaired.

The teaching apparatus produces and displays state information for the robot 2 that has been virtually reproduced. Thus, the robot 2 can be taught, for example, regardless of whether operation is difficult for the worker, due to the robot being large or the environment of the robot being not suitable for teaching.

The teaching apparatus produces and displays state information for the robot 2 that is actually present. Thus, an actually present robot 2 can be taught.

The teaching apparatus virtually reproduces a reference object. In the site where the robot 2 is actually installed, it is assumed that no object that can be a reference for determining the position or the posture of the robot 2 is arranged around the robot 2 for safety reasons. Even under such conditions, the robot 2 can be taught by virtually reproducing a reference object.

The teaching apparatus uses an actually present object as a reference object. Thus, the robot 2 can be taught in an actual environment, and can be prevented from colliding with peripheral equipment.

The teaching apparatus produces state information taking the orientation of the wrist of the robot 2 as being the posture of the robot 2. While the robot 2 typically includes a plurality of arms, it is considered that it is the wrist that is subjected to teaching in terms of position and orientation. Therefore, the robot 2 can be appropriately taught by taking the orientation of the wrist of the robot 2 as being the posture of the robot.

The teaching apparatus provides notification to the worker if the robot 2 is positioned relative to a reference object, at a distance smaller than a predetermined reference distance, or if the posture of the robot 2 is tilted relative to the object, at an angle larger than a predetermined angle. Thus, for example, the robot is prevented from colliding with actually present peripheral equipment, or from being taught to cross over the robot's movement range which is established for safety reasons.

The teaching apparatus displays state information in a mode perpendicular or parallel to a reference object irrespective of the posture of the robot 2. In this case, the state information is displayed on a surface of a reference object located in a direction in which the robot 2 moves, or in a space defined by reference objects located in a direction in which the robot 2 moves, or at a position adjacent to another piece of state information displayed on a surface of the reference object, so as not to overlap with the wrist 2a of the robot 2, the tool 6 mounted to the wrist 2a, or the workpiece 7 handled, e.g., held, by the tool 6.

Specifically, state information is displayed in the present embodiment with a central focus on the workpiece 7 and at a position not overlapping with the workpiece 7. Thus, the worker's visual field will not be blocked by the state information being displayed. While state information indicates the posture of the robot 2, e.g., tilting of the wrist 2a or the workpiece 7, it is displayed perpendicular or parallel to a reference object, or displayed in a mode of using a reference object, instead of the robot 2, as a reference. Therefore, the worker can easily visually keep track of the posture of the robot 2. Thus, for example, the tool is prevented from disappearing from view due to the state information being displayed, i.e., the state information will not be an obstacle when displayed but helps the worker easily find a relation to the posture of the robot.

The teaching apparatus described above uses a teaching method including, when a worker operates the robot 2, displaying at least one of the position and the posture of the robot 2 relative to a reference object located around the robot 2, so as to overlap with the worker's visual field. Thus, the worker can visually keep track of the distance between the reference object and the robot 2 or tilting of the robot 2 relative to the reference object without impairing the merits of using direct teaching. Accordingly, similarly to the teaching apparatus, even when using direct teaching, the position or the posture of the robot 2 can be easily found and teaching can be performed appropriately and promptly.

The teaching apparatus described above is not limited to have the configuration shown in the above embodiment but may be appropriately modified without departing from the spirit of the present disclosure.

The number of reference objects or the mode of reproduction are only examples and are not limited thereto. When reproducing a reference object in a virtual space, a specific object to be reproduced may be determined based on the moving direction of the robot 2. For example, if the robot 2 is moving in the vertical direction, a vertical plane that is perpendicular to the surface on which the robot 2 is set up may be reproduced as a reference object, or if the robot 2 is moving in the horizontal direction, a parallel plane that is parallel to the surface on which the robot 2 is set up may be reproduced as a reference object.

The embodiment described above shows an example of configuring the teaching apparatus by the image processor 4 and the wearable display 5. However, if the robot 2 is reproduced in a virtual space, the teaching system 1 corresponds to the teaching apparatus.

The display mode used for the state information shown in the embodiment described above is only an example, but other display modes may be used. In other words, other graphic patterns, characters or symbols may be used for the state information, as long the position or the posture of the robot 2 can be offered. Furthermore, displaying colors may be made different to show difference in the moving direction or the degree of tilting.

Various pieces of state information may be offered such as for a reference object nearest to the robot 2, for two or more reference objects at short distances from the robot 2, or for reference objects located in a predetermined distance from the robot 2.

The state information may be produced for a reference object located in a moving direction of the robot. Thus, the robot is prevented from colliding with, for example, actually present peripheral equipment. In this case, the reference object may be the boundary of the movement range set for safety reasons, so that the robot is prevented from crossing over the movement range set for safety reasons.

The notification section is not limited to the configuration of providing a visual notification using the display surfaces 5a, but may be configured to audibly prove a notification using a speaker or a buzzer.

The embodiment described above shows an example of determining whether a limitation factor is present within a predetermined distance from the wrist 2a or the workpiece 7. However, the presence of a limitation factor within a predetermined distance from the wrist 2a in the travel distance thereof may be determined based on change of posture in the past.

The embodiment described above shows an example of constantly displaying the state information. However, the state information may be configured to be displayed when entry of the wrist 2a or the workpiece 7 into the worker's visual field has been specified by the image processing.

The embodiment described above shows an example of specifying a positional relationship between the worker and the robot 2 by the wearable display 5 or the environment sensor 8. However, a CCD camera may be provided as the environment sensor 8 and an image captured by the CCD camera may be processed to specify a positional relationship between the worker and the robot 2.

PARTIAL REFERENCE SIGNS

In the drawings, 1 indicates a teaching system (teaching apparatus), 2 indicates a robot, 4 indicates an image processor (teaching apparatus), 5 indicates a wearable display (teaching apparatus), 5a indicates a display unit (teaching apparatus, notification section), 10a indicates an acquisition section, and 10b indicates a production section.

What is claimed is:

1. A teaching apparatus that teaches an industrial robot a task by direct teaching, comprising:
   a wearable display that is wearable by a worker;
   an acquisition section configured to acquire position and posture data capable of specifying a position and a posture of the robot relative to a reference object; and
   a production section configured to produce state information to be displayed on the wearable display, the state information being provided in a visual field of the worker by the wearable display,
   wherein, when a worker operates the robot for the direct teaching, the production section is configured to produce the state information that indicates i) the position and posture of the robot relative to the reference object and ii) a distance between a workpiece held by the robot and the reference object; and
   the wearable display is configured to display the produced state information.

2. The teaching apparatus according to claim 1, wherein the production section is configured to produce the state information that indicates the information about the distance is displayed on the reference object.

3. The teaching apparatus according to claim 2, wherein the reference object for the position and posture is different from the reference object for the distance.

4. The teaching apparatus according to claim 2, wherein the robot is a virtually reproduced robot.

5. The teaching apparatus according to claim 4, wherein
the production section is configured to produce the state information that indicates the position of the robot relative to the reference object and a posture of the robot relative to the reference object, and
the apparatus comprises a notification section configured to provide a notification when the distance is smaller than a predetermined reference distance, and when a tilt of the robot, which is the posture of the robot relative to the object, is at an angle larger than a predetermined reference angle.

6. The teaching apparatus according to claim 2, wherein the robot is an actually present robot.

7. The teaching apparatus according to claim 6, wherein the reference object is a virtually reproduced reference object.

8. The teaching apparatus according to claim 6, wherein the reference object is an actually present reference object.

9. The teaching apparatus according to claim 6, wherein the production section takes an orientation of a wrist of the robot as being a posture of the robot to produce the state information.

10. The teaching apparatus according to claim 6, wherein
the production section is configured to produce the state information that indicates the position of the robot relative to the reference object and a posture of the robot relative to the reference object, and
the apparatus comprises a notification section that configured to provide a notification when the distance is smaller than a predetermined reference distance, and when a tilt of the robot, which is the posture of the robot relative to the object, is at an angle larger than a predetermined reference angle.

11. The teaching apparatus according to claim 6, wherein the state information is displayed in a mode perpendicular or parallel to the reference object irrespective of the posture of the robot, the state information being displayed on a surface of the reference object located in a direction in which the robot moves, or in a space between the robot and the reference object located in a direction in which the robot moves, or at a position adjacent to another piece of state information displayed on a surface of the reference object, so as not to overlap with a wrist of the robot, a tool mounted to the wrist, or a workpiece handled by the tool.

12. The teaching apparatus according to claim 2, wherein the reference object is a virtually reproduced reference object.

13. The teaching apparatus according to claim 2, wherein the reference object is an actually present reference object.

14. The teaching apparatus according to claim 2, wherein the state information is displayed in a mode perpendicular or parallel to the reference object irrespective of the posture of the robot, the state information being displayed on a surface of the reference object located in a direction in which the robot moves, or in a space between the robot and the reference object and located in a direction in which the robot moves, or at a position adjacent to another piece of state information displayed on a surface of the reference object, so as not to overlap with a wrist of the robot, a tool mounted to the wrist, or a workpiece handled by the tool.

15. The teaching apparatus according to claim 1, wherein the production section is configured to take an orientation of a wrist of the robot as being the posture of the robot to produce the state information.

16. The teaching apparatus according to claim 1, wherein,
the production section is configured to produce the state information that indicates the position of the robot relative to the reference object and a posture of the robot relative to the reference object, and
the apparatus comprises a notification section configured to provide a notification when the distance is smaller than a predetermined reference distance, and when a tilt of the robot, which is the posture of the robot relative to the object, is at an angle larger than a predetermined reference angle.

17. The teaching apparatus according to claim 1, wherein the reference object is a virtually reproduced reference object.

18. The teaching apparatus according to claim 1, wherein the reference object is an actually present reference object.

19. The teaching apparatus according to claim 1, wherein the production section takes an orientation of a wrist of the robot as being a posture of the robot to produce the state information.

20. The teaching apparatus according to claim 1, wherein the state information is displayed in a mode perpendicular or parallel to the reference object irrespective of the posture of the robot, the state information being displayed on a surface of the reference object located in a direction in which the robot moves, or in a space between the robot and the reference object located in a direction in which the robot moves, or at a position adjacent to another piece of state information displayed on a surface of the reference object, so as not to overlap with a wrist of the robot, a tool mounted to the wrist, or a workpiece handled by the tool.

21. A teaching method of teaching an industrial robot a task by direct teaching, comprising:
acquiring position and posture data capable of specifying a position and a posture of the robot relative to a reference object;
producing state information to be displayed on a wearable display worn by a worker who teaches the robot a task for the direct teaching, the state information being provided in a visual field of the worker by the wearable display,
wherein the producing step produces the state information that indicates, at least, the position of the robot relative to the reference object, based on the acquired position and posture data, and the state information that indicates the position of the robot including information showing a distance between a workpiece held by the robot and the reference object; and
enabling the wearable display to display the produced state information.

* * * * *